UNITED STATES PATENT OFFICE.

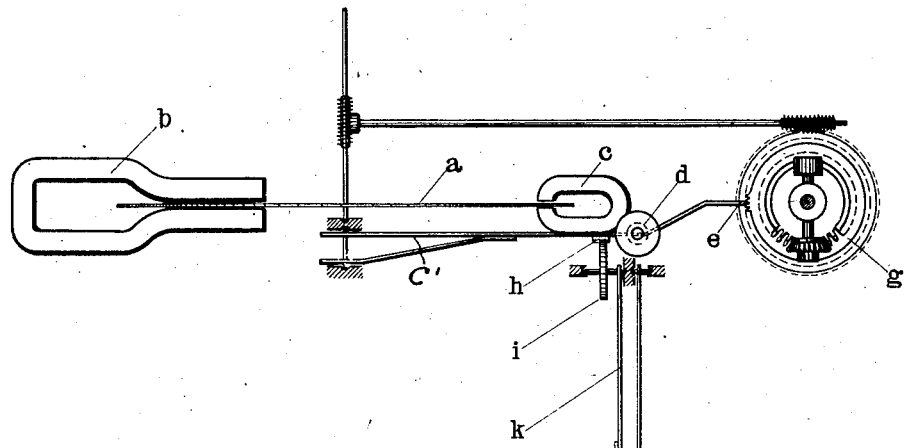
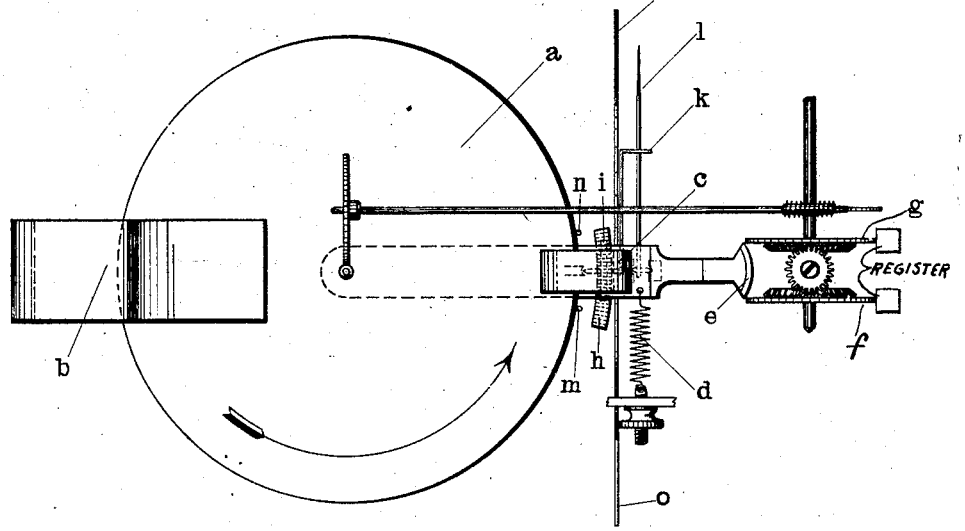

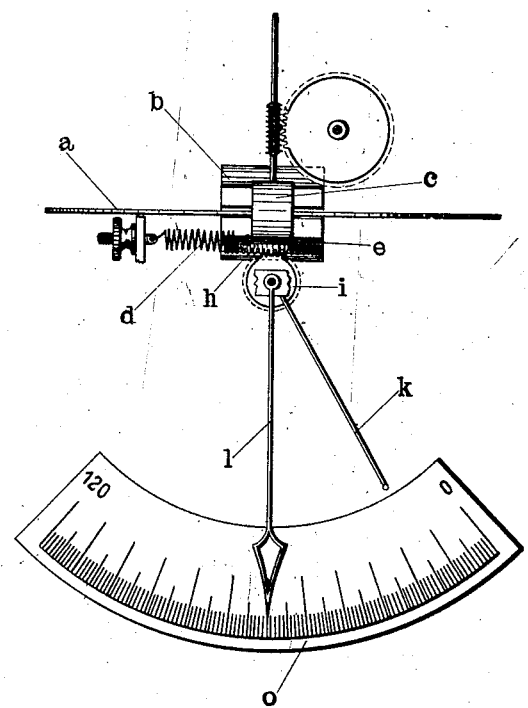

EVAN EVANS, OF BERLIN, GERMANY, ASSIGNOR, BY MESNE ASSIGNMENTS, TO GENERAL ELECTRIC COMPANY, A CORPORATION OF NEW YORK.

ELECTRICITY-METER.

1,010,416.

Specification of Letters Patent.

Patented Dec. 5, 1911.

Application filed June 3, 1908. Serial No. 436,420.

*To all whom it may concern:*

Be it known that I, EVAN EVANS, a subject of the Emperor of Germany, and a resident of Berlin, Germany, have invented certain new and useful Improvements in Electricity-Meters, of which the following is a specification.

The object of my invention is to so govern the registering train of the meter, that it will be operated differently according to the rate of consumption.

Another feature which I have incorporated in the improved meter illustrated by the drawings relates to a maximum consumption indicator so arranged that it will indicate the maximum rate of consumption which took place during the operation of the meter.

Reference is to be had to the accompanying drawings, in which—

Figure 1 is a side elevation showing the chief parts of my improved meter; Fig. 2 is a plan; and Fig. 3 is a front elevation.

$a$ is a rotary metallic element for instance a brake disk, connected with the motor part of the meter, so that it will revolve at a speed proportional to the rate of consumption; that is, the higher the rate of consumption, the greater the speed.

$b$ is the well-known brake magnet. At the side of the disk opposite to the magnet $b$, I have arranged movably, a small magnet $c$ in such a way that the braking action of this magnet upon the disk is constant as nearly as possible. The preferred construction as shown consists in securing the magnet $c$ to a carrier $c'$ mounted to swing about an axis coincident with that of the disk $a$. When this disk rotates in the direction indicated by the arrow in Fig. 2, the eddy currents will have a tendency to move the magnet $c$ and the carrier $c'$ along in the direction of rotation, and this tendency is resisted by the spring $d$, the tension of which may be adjusted by means of the nut $d'$. Stops $m$ and $n$ limit the movement of the magnet $c$, it being understood that the spring $d$ will draw the magnet and carrier toward the stop $m$. It will be understood that as long as the rate of consumption of electricity is below a certain limit, the eddy current influence tending to move the magnet $c$ will not be strong enough to overcome the resistance of the spring $d$, but as soon as this limit is exceeded, the magnet $c$ and its carrier will be shifted toward or against the stop $n$. This movement of the carrier $c$ is utilized for shifting a suitable mechanism. For instance the carrier $c$ may be provided with an edge $e$ adapted to engage and lock one or the other of two gear wheels $f$ and $g$. Each of these gear wheels is connected with a different indicating or registering train and these wheels $f$ and $g$ are driven from the motor part of the meter by means of differential gearing in the well known manner. Thus as long as the edge $e$ is in engagement with the gear wheel $f$, only the registering train which is connected with the gear wheel $g$ will be in operation; and when the magnet $c$ is shifted so as to bring the edge $e$ into locking engagement with the gear wheel $g$, then only the registering train which is connected with the gear wheel $f$ will be in operation. By properly regulating the tension of the spring $d$ I can accurately adjust the device so that the change from one registering train to the other will be made at a predetermined limit or rate of consumption.

The device so far described will register the electricity consumed, by means of the registering train connected with the gear wheel $g$ as long as the rate of consumption is below a certain limit; if this limit is exceeded, the consumption will be registered by means of the train connected with the gear wheel $f$. It will be obvious that I might omit one or the other of these registering trains, if it is desired to register the consumption only below or above a certain limit or rate of consumption.

The extent of the angular movement of the carrier $c'$ or the distance through which the magnet $c$ follows the disk $a$ depends on the rotary speed of said disk and is therefore a measure of the rate of consumption. From this it follows that the movement of the magnet $c$ and its carrier $c'$ may be utilized to operate a maximum rate indicator. In the particular construction illustrated by the drawings a toothed segment $h$ is secured rigidly to the carrier $c'$ and meshes with the pinion $i$ connected rigidly with an arm $k$. This arm has one end bent to engage a hand $l$, which is mounted loosely but with sufficient friction to cause it to stay in whatever position it may have been brought to by the action of the arm $k$. The arm $k$ swings from right to left in Fig.

3 if the carrier $c'$ moves in the direction of the arrow in Fig. 2. The hand $l$ is thus shifted toward the left and remains in such position unless at some later time a greater deflection of the arm $k$ should occur, in which case the hand $l$ will be carried farther toward the left. The hand indicates on a scale $o$, the zero point of which corresponds to the initial position of the hand $l$ and arm $k$, with the carrier $c$ withdrawn against the stop $m$ by the spring $d$. The hand $l$ will therefore indicate the maximum rate of consumption which has occurred since the last observation. The hand may be returned manually to its normal position whenever desired, say every 24 hours.

I claim as my invention;

1. In an electricity meter, the combination of a rotary metal member, a magnet mounted to swing about the said member's axis of rotation, means for preventing a rotation of the magnet, a rock shaft having an operative connection with the magnet, a maximum consumption indicating hand loose relatively to said shaft, and an arm rigid on said shaft and arranged to move said hand in one direction only.

2. In an electricity meter, the combination of a metal member movable according to the rate of consumption, a magnet movably mounted so that under the influence of eddy currents it may follow the movement of said member, a differential gear in operative relation with the member, registering trains in operative relation with said gear, means in operative relation with the magnet causing one of said trains to register above a predetermined rate of consumption, a rock shaft having an operative connection with the magnet, a maximum consumption indicating hand loose relatively to said shaft, and an arm rigid on said shaft and arranged to move said hand in one direction only.

In testimony whereof I have hereunto set my hand in the presence of two subscribing witnesses.

EVAN EVANS.

Witnesses:
   Woldemar Haupt,
   Henry Hasper.